United States Patent [19]

Lewis

[11] Patent Number: 4,721,859

[45] Date of Patent: Jan. 26, 1988

[54] PROCESSING OF OPTICAL INFORMATION BY INDEXING WITH A GRATICULE SCALE

[76] Inventor: John Lewis, 55 Linkside Avenue, Oxford, Oxfordshire, England

[21] Appl. No.: 709,349

[22] Filed: Mar. 5, 1985

Related U.S. Application Data

[63] Continuation of Ser. No. 358,978, Mar. 17, 1982, abandoned.

[30] Foreign Application Priority Data

Mar. 25, 1981 [GB] United Kingdom ............... 8109337

[51] Int. Cl.⁴ .................................. G06K 7/10
[52] U.S. Cl. .......................... 250/566; 235/470; 235/473; 235/474; 382/59; 250/227
[58] Field of Search .............. 250/227, 566, 568–571, 250/561, 555–557; 235/470, 473, 474, 472; 382/59, 23, 68

[56] References Cited

U.S. PATENT DOCUMENTS

| | | |
|---|---|---|
| 3,729,618 | 4/1973 | Drew et al. ........................ 235/470 |
| 3,786,417 | 1/1974 | Carlson ........................ 235/473 X |
| 3,801,776 | 4/1974 | Goeppinger et al. ........... 250/569 X |
| 3,835,297 | 9/1974 | Inoue et al. ..................... 235/473 X |
| 4,021,664 | 5/1977 | Ormsby ............................. 250/227 |
| 4,228,952 | 10/1980 | Britton ............................. 235/473 |
| 4,260,979 | 4/1981 | Smith ................................. 382/59 |

FOREIGN PATENT DOCUMENTS

| | | | |
|---|---|---|---|
| 0009322 | 1/1977 | Japan ................................ 235/474 |
| 0025151 | 2/1980 | Japan ................................ 382/59 |
| 0037971 | 3/1982 | Japan ................................ 382/59 |
| 1115681 | 5/1968 | United Kingdom . | |

Primary Examiner—Edward P. Westin
Attorney, Agent, or Firm—Martin LuKacher

[57] ABSTRACT

Apparatus for enabling processing of optical information particularly characters which has at least one indexer for indexing information corresponding to at least a portion of at least one source of optical information, so as to provide indexed optical information. The index means is adapted such that the indexing will be in accordance with the processing. An optical fibre arrangement conveys at least a portion of the indexed optical information, optionally with at least a portion of non-indexed optical information. The optical fibre arrangement uses at least one optical fibre.

15 Claims, 2 Drawing Figures

PROCESSING OF OPTICAL INFORMATION BY INDEXING WITH A GRATICULE SCALE

This is a continuation of application Ser. No. 358,978, filed 3/17/82, now abandoned.

Description

The present invention relates to processing of optical information.

Optical information can be provided and/or processed in different ways. One process is to convey optical information via at least one optical fibre. There is continuing interest in finding new applications for optical fibres.

In this specification, a source of optical information can be provided in any way, e.g. be constituted by a substrate, or a two or three dimensional object on a substrate, or a two or three dimensional image (e.g. a hologram). Said source can have any configuration, e.g. be constituted by at least a portion of at least one indicium or body. Some examples of indicia or bodies are: letters, words, numbers, of various scripts; or ideograms (e.g. Chinese or Japanese or Egyptian hieroglyphs); or musical notes; or shapes of air-, land-, sea-, or space-vehicles, or astronomical or terrestrial or geometrical shapes.

According to a first aspect of the present invention, there is provided apparatus for enabling processing of optical information, said apparatus comprising: index means for indexing information corresponding to at least a portion of at least one source of optical information, so as to provide indexed optical information, said index means being adapted such that said indexing will be in accordance with said processing; and optical fibre means for conveying at least a portion of said optical information and/or at least a portion of said indexed optical information, optionally with at least a portion of said non-indexed optical information.

Said apparatus can comprise at least one movably or statically locatable said source of optical information, but this is not essential because at least one said source need not be part of said apparatus. When a said source is part of said apparatus, said source can comprise means for generating said optical information from at least one input. Examples of such generator means are: image projection means (e.g. projectors of films, slides, or transparencies); magnification means (e.g. microscopes, telescopes or binoculars); image intensifier means; and display means. Said apparatus can be adapted to compare optical information received at the same or different times from at least two said sources.

Said apparatus can comprise at least one movably or statically locatable means for radiating at least a portion of at least one said source with radiation, this radiation enabling or assisting said source to provide said optical information to be indexed. The illumination can be for at least one period of time, e.g. be determined manually and/or be predetermined and/or determined by feedback from operation of said apparatus. Examples of illuminators are: incandescent lamps; flourescent lamps; lasers; light emitting diodes; flash discharges; spark discharges. There can be provided between said illumination means and said source at least one optical device, e.g. selected from filter means, lens means, polariser means, and reflector means. Such a device will process said radiation.

At least a portion of said index means can be movably or statically locatable, e.g. on an object, and/or on a substrate, and/or separate from an object and/or substrate. It will be appreciated that at least one index could be printed onto a substrate that will have or receive e.g. a printed object. Said index means is preferably between said source and said optical fibre means during use of said apparatus, and/or alongside said source. Said index means can be adapted to provide at least one marker, e.g. a marker constituted by an object or an image. Said index means can be adapted to provide in at least one direction at least a portion of said indexing, e.g. with equal or proportional spacing of indices. Said indexing can be for at least one period of time, e.g. be determined manually and/or be predetermined and/or determined by feedback from operation of said apparatus. There can be provided between said index means and said source and/or between said index means and said optical fibre means at least one optical device, e.g. selected from filter means, lens means, polariser means, and reflector means. Such a device will process optical information, e.g. lens means for focusing optical information.

At least a portion of said optical fibre means can be movably or statically locatable. Said optical fibre means can comprise at least one optical fibre. Optical fibres in a plurality thereof (e.g. a bundle or an array) can be disposed relative to each other in any suitable way, e.g. at least two can be parallel, slope, or cross over relative to each other. A plurality of said fibres can code optical information conveyed by them. At least a portion of said optical fibre means can convey at least a portion of said radiation to e.g. said object. The dimensions of optical fibres will be chosen according to use of said apparatus. Preferably, the cross-section of at least one optical fibre will be substantially the same as the cross-section of at least a portion of said source.

Said apparatus can comprise scan means for providing scanning motion of any suitable movable portion thereof (e.g. said optical fibre means), said scan means being adapted such that said scanning will be in accordance with said processing. The scanning can be for at least one period ot time, e.g. be determined manually and/or be predetermined and/or determined by feedback from operation of said apparatus, and be in at least one direction.

Said apparatus can comprise at least one movably or statically locatable detector means for detecting at least a portion of e.g. indexed optical information conveyed by at least one said optical fibre. Said detector means can be adapted to provide a record of said detected information, e.g. comprise photographic means or means for forming an electrostatic latent image from at least a portion of said detected information. Said detector means can be adapted to provide at least one signal (e.g. electrical) from at least a portion of indexed or other optical information. There can be provided between said optical fibre means and said detector means at least one optical device, e.g. selected from filter means, lens means, polariser means, and reflector means. Such a device will process indexed optical information.

Said apparatus can comprise signal processor means for processing at least a portion of at least one said signal so as to give at least one output. Said processor means can comprise converter means for converting at least a portion of at least one said signal into at least one further signal, e.g. convert an analogue signal into a digital signal. Said processor means can comprise microprocessor means. Said processor means can comprise memory means, e.g. a random access memory (RAM memory) and/or a read only memory (ROM memory for instance of the PROM (Programmable ROM) kind). Said processor means can comprise display means, e.g. cathode ray tube display. Said processor means can be adapted so that said apparatus can be embodied in different ways. Examples of those embodiments are:

apparatus for recognising number, shape, and/or at least one colour of at least one said source (e.g. a character or stamp);
apparatus for use in navigation (e.g. in navigating a vehicle);
apparatus for translating and/or coding information;
apparatus for facsimile or other transmission of information;
apparatus for providing control in operation of further apparatus (e.g. in manufacture or in war applications);
apparatus for use in medicine and/or surgery.

In the accompanying drawing which is given by way of example of the present invention:

Figure 1:
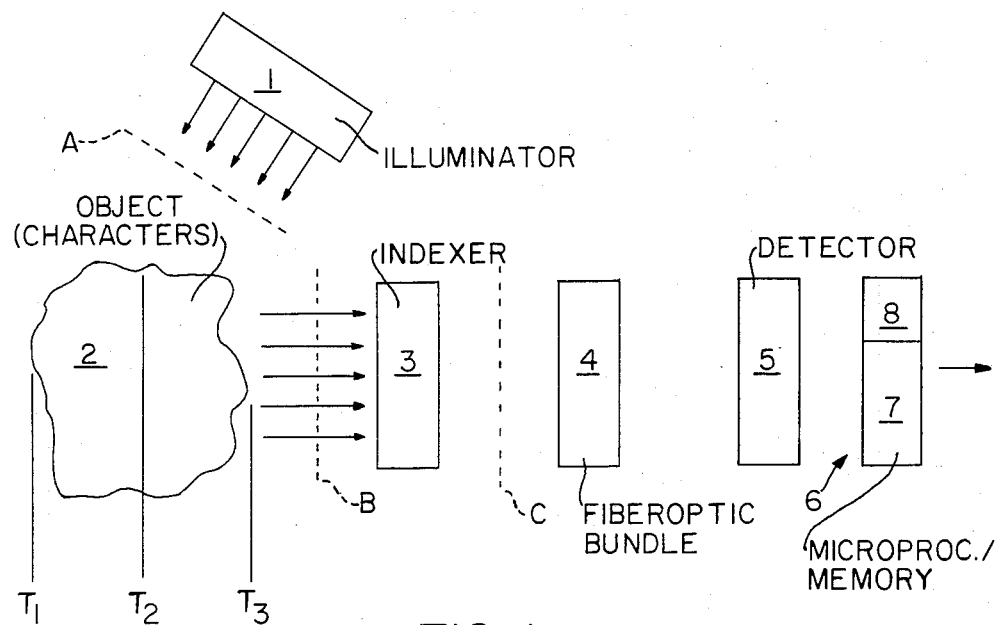
FIG. 1 is one schematic representation of apparatus comprising a microprocessor.

In FIG. 1, an illuminator 1 gives radiation (e.g. visible and/or infra red radiation) incident on an object 2 (e.g. a letter or number), from which radiation is reflected to indexer 3, which provides indexed optical information according to locations $T_1$, $T_2$, $T_3$ comprised by object 2. This indexed information is seen by optical fibre bundle 4 which scans the output region of indexer 3, and is thereby conveyed to detector 5 which converts the detected, indexed optical information into electrical signals that pass to a signal processor 6 comprising a microprocessor 7 and a memory 8, which the microprocessor can access and/or communicate with. The output of the signal processor 6 (there can be at least one output channel) can be utilised in any suitable way.

Figure 2:
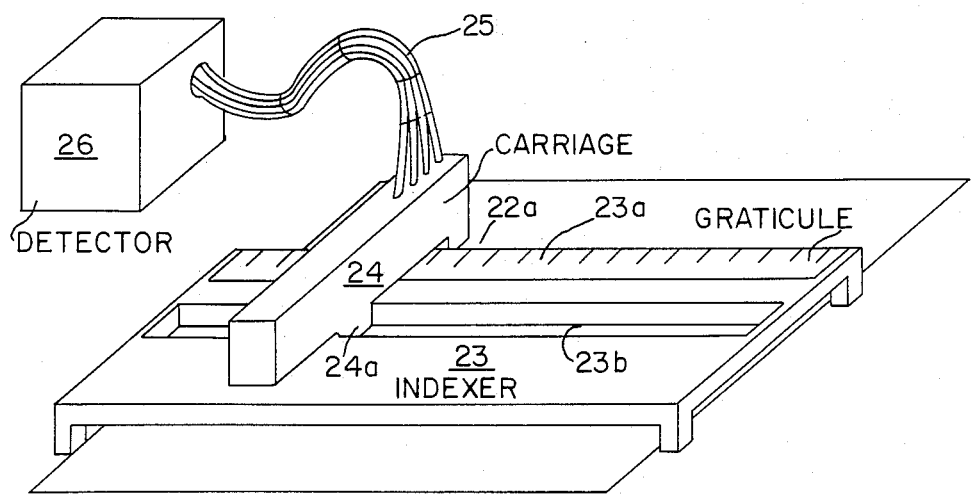
FIG. 2 is one schematic representation of apparatus comprising a manually operable graticule.

In FIG. 2, an object 22 (e.g. typescript) reflects light to an indexer 23 comprising a graticule in the form of a light transmitting scale 23a mounted above and spaced from object 22. Indexer 23 has a key way 23b in which is slidably located key 24a from the underside of a carriage 24 to which is mounted an optical fibre bundle 25. By moving the carrige 24, the optical fibre bundle can scan the scale 23a and thereby receive indexed optical information generated by scale 23a and/or from object 22. When the bundle is between the markers, the optical information is referred to non-indexed information. The optical information conveyed via optical fibre bundle 25 can be used in any suitable way, e.g. be passed to a detector 26 as in FIG. 1, for generation of electrical signals for processing by a signal processor as in FIG. 1.

It will be appreciated that the apparatus shown in the drawing can be embodied in accordance with the description given before the above description of the drawings, e.g. at at least one of regions A, B, C, at least one optical device can be provided, for instance lens or reflector means as mentioned earlier above. Indexer 23 provides markers along an X-axis, but additionally or alternatively can provide markers (not shown) along a Y-axis, thereby enabling indexed optical information to be expressed in terms of x, y coordinates. The carriage 24 and/or optical fibre bundle 25 can be adapted to enable scanning in e.g. x and/or y directions. In general, the scanning can have at least one directional component (e.g. x and/or y components) separated by e.g. 90°. The scanning could have at least one polar component.

I claim:

1. Apparatus for enabling recognition of the shape of a character, comprising:
a graticule scale for overlying said character;
at least one optical information conveying means having input and output ends, said graticule scale comprising spaced apart markers for being seen by said input end of said at least one optical information conveying means to provide indexed optical information when one of said markers overlies at least a portion of said character and to provide non-indexed information when an interval between two of said markers overlies the character such that said optical information conveying means can receive said indexed and non-indexed information for discharge from said output end thereof;
at least one scan means for moving said input end of said optical information conveying means so that said input end will scan said indexed information and said non-indexed information; and
detector means for receiving from said output end of said optical information conveying means said discharged indexed and non-indexed optical information, said detector means being adapted to provide from said received indexed and non-indexed optical information at least one output signal appropriate to said recognition of character shape.

2. Apparatus as claimed in claim 1, wherein said scan means comprises a carriage moveable relative to said scale so as to enable said scanning.

3. Apparatus as claimed in claim 1, further comprising signal procesor means, and wherein said detector means is adapted for generation of said output signal for processing by said signal processor means.

4. Apparatus as claimed in claim 1, further comprising at least one lumination means for radiating at least a portion of said character.

5. Apparatus as claimed in claim 1 wherein said optical information conveying means is optical fiber means.

6. Apparatus for controlling the acquisition of data in an optical character recognition system having a manually movable optical head for converting optical data in the form of a series of characters on a medium to a plurality of electrical signals, said apparatus comprising:
a manually positionable aligning means for guiding manual movement of said head along the series of characters on said medium;
a reticle forming a sequence of optically differentiable portions extending on and along said aligning means in the direction of scanning at positions unrelated to the positions of said characters in the direction of scanning;
means, attached to said head, for reading said characters and reticle; and
means, responsive to said reading means, for causing said head to generate one of said electrical signals every time said head has moved a predetermined distance.

7. Apparatus as in claim 6 wherein:
said reticle includes at least a portion transverse to the path of said head; and
said reading means includes means for monitoring the position of points of said reticle normal to the path of said head.

8. Apparatus as in claim 6 wherein said reading means includes a linear sensor array disposed normal to said path of said head.

9. Apparatus as in claim 6 wherein said aligning means comprises:
- a track to be laid along said series of characters; and
- means, attached to said head, for following said track.

10. Apparatus as in claim 6 wherein said aligning means includes:
- a body for alignment with characters to be read;
- a rail attached to said body; and
- means defining a groove in said head for cooperating with said rail to guide said head.

11. A method for controlling the acquisition of data in an optical character recognition system having a manually movable head for scanning a line of said characters, said method comprising the steps of:
- manually positioning a guide adjacent said line of characters so that optically differentiable portions of said reticle extend along said line adjacent thereto, the positions of said characters being unrelated to the positions of said portions along the direction of scanning;
- scanning along a reticle to detect said characters as said head moves along said characters;
- reading said reticle during said scanning; and
- causing, in response to said reading step, said head to output data every time said head has moved a predetermined distance.

12. A method as in claim 11 wherein:
- said reticle includes at least a portion transverse to the direction of scanning;
- said reading step includes the step of monitoring the position of points of said reticle normal to said direction of scanning; and
- said causing step includes the step of translating said normal position to a position of said head.

13. A method as in claim 12 wherein said monitoring step is performed by a linear sensor array disposed normal to said scanning direction.

14. Apparatus for acquisition of optical data extending in a line comprising:
- a head manually movable along the direction of scanning including an optical sensor for detecting optical data extending in a line along the direction of scanning;
- manually positionable means for guiding manual scanning of said head along said line, said optical data including characters to be recognized extending on a medium along the direction of scanning and optically differentiable portions on said guiding means extending adjacent said characters along the direction of scanning, the positions of said characters and differentiable portions being unrelated along the direction of scanning; and
- means for processing the portion of said optical data on said medium in accordance with the portion of said optical data on said guiding means to produce data suitable for recognizing said characters.

15. An apparatus as in claim 14 wherein said processing means includes means for determining the speed of said head from the detected optically differentiable portions.

* * * * *